United States Patent
Pfob et al.

(10) Patent No.: US 7,793,945 B2
(45) Date of Patent: Sep. 14, 2010

(54) TOOL HOLDING FIXTURE

(75) Inventors: Franz Pfob, Probstried (DE); Horst Leidner, Altusried (DE)

(73) Assignee: Zettl GmbH, Betzigau (DE)

( * ) Notice: Subject to any disclaimer, the term of this patent is extended or adjusted under 35 U.S.C. 154(b) by 944 days.

(21) Appl. No.: 11/629,454

(22) PCT Filed: Jun. 15, 2005

(86) PCT No.: PCT/EP2005/006420

§ 371 (c)(1),
(2), (4) Date: Dec. 13, 2006

(87) PCT Pub. No.: WO2005/123314

PCT Pub. Date: Dec. 29, 2005

(65) Prior Publication Data

US 2007/0257450 A1    Nov. 8, 2007

(30) Foreign Application Priority Data

Jun. 17, 2004   (DE) .................. 20 2004 009 500 U

(51) Int. Cl.
*B23B 31/16*   (2006.01)

(52) U.S. Cl. .............................. 279/66; 279/71; 279/72; 279/73; 279/81; 279/89

(58) Field of Classification Search ............ 279/71–73, 279/81, 89, 93
See application file for complete search history.

(56) References Cited

U.S. PATENT DOCUMENTS 3,747,946 A * 7/1973 Edens .................... 279/81
4,298,208 A * 11/1981 Benjamin et al. ........... 279/91

* cited by examiner

*Primary Examiner*—David P Bryant
*Assistant Examiner*—Bayan Salone
(74) *Attorney, Agent, or Firm*—Notaro, Michalos & Zaccaria P.C.

(57) ABSTRACT

Arrangement for holding a tool fitting has a spindle with a forward directed surface and a bore which intersects the forward directed surface and which, starting from such surface, extends rearwardly in order to receive a shaft of the tool fitting. A device for locking the tool fitting with the spindle has an inner and an outer locking element which engage on another. The locking elements act in the manner of a bayonet coupling, wherein a projecting element is disposed in a blind stop groove extending first axially and subsequently radially in a circumferential surface starting from an end face.

7 Claims, 1 Drawing Sheet

TOOL HOLDING FIXTURE

Figure 1:
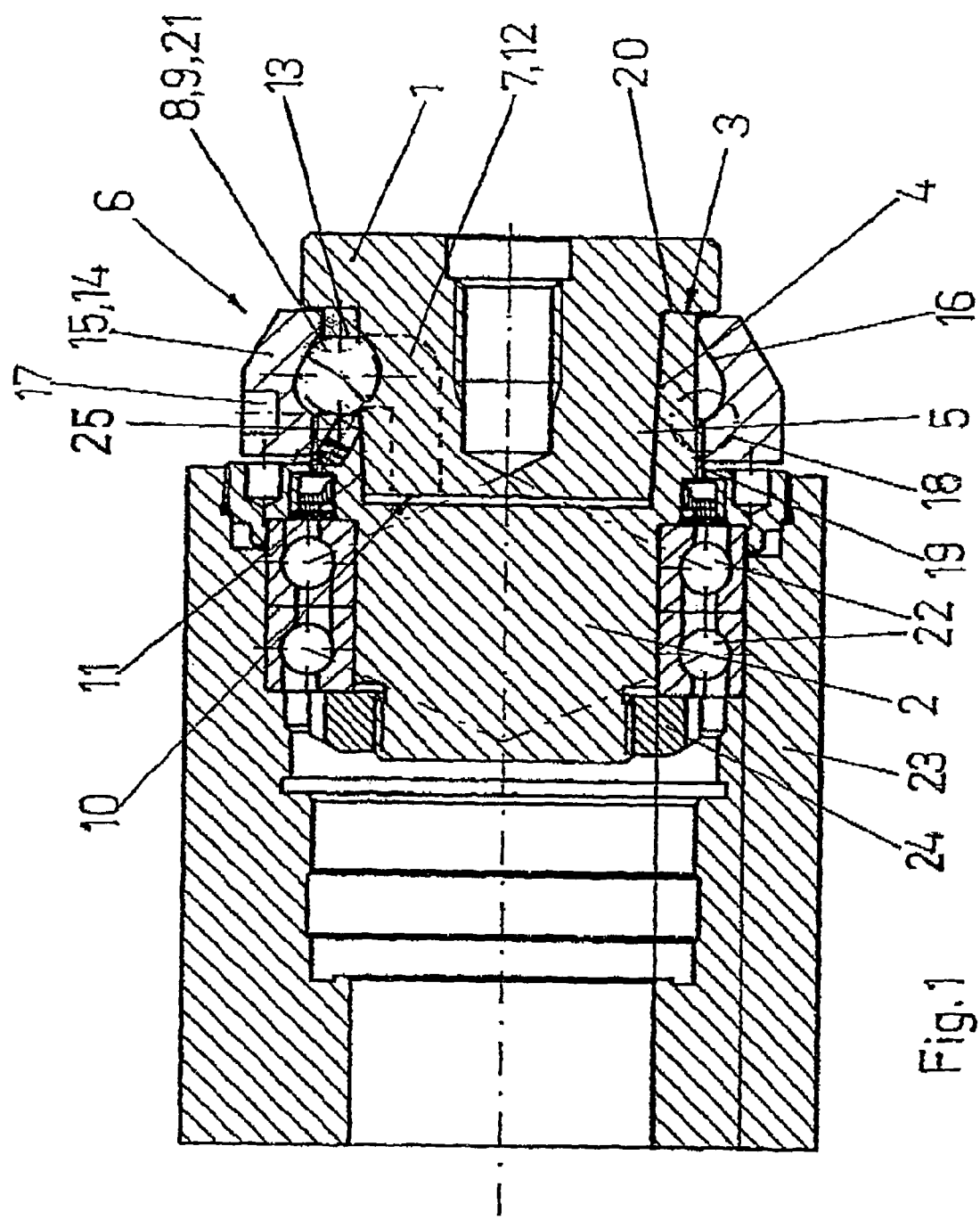

The invention relates to an arrangement for holding a tool fitting, in particular for driven tools, the arrangement comprising a spindle with a forward directed surface and a bore which intersects the forward directed surface and which, starting from such surface, extends rearwardly in order to receive a shaft of the tool fitting, as well as with a device for locking the tool fitting with the spindle, in which are provided an inner and an outer locking element which engage with one another.

An arrangement according to the genus is disclosed in DE 37 81 559 T2.

Of disadvantage in the known arrangement is that it has a relatively long structural shape and, due to centrally disposed actuation means, does not permit the central supply of media, for example lubricating means.

A further arrangement, in which the locking of the exchangeable parts takes place by means of balls, is disclosed in DE 199 20 407 A1. This arrangement also has the previously listed disadvantages.

In machining centers, in which for example onto the turret head driven tools are clamped, a large structural length of the arrangement hinders the working area of the tools on the workpiece. Therefore short-structured fitting arrangements which make possible the simple, rapid and precise exchange of driven tools, are favored by operators of machining centers.

The aim of the invention is providing an arrangement for holding a tool fitting, which has an especially short structural shape, which, moreover, permits the axial supply of media, such as for example cooling lubricants.

This aim is attained in an arrangement for holding a tool fitting, in particular for driven tools, the arrangement comprising a spindle with a forward directed surface and a bore which intersects the forward directed surface and which, starting from this surface, extends rearwardly in order to receive a shaft of the tool fitting, as well as with a device for locking the tool fitting with the spindle, in which an inner and an outer locking element are provided, which engage with one another, thereby that the locking elements are implemented such that they function in the manner of a bayonet coupling, wherein a projecting element is disposed in a groove extending from an end face first axially then radially in the circumferential surface in a blind stop. In this way the actuation of the locking is advantageously moved from the central area of the arrangement to the periphery. The locking can readily take place manually from the outside. The function of such locking in the manner of a bayonet coupling is self-explanatory for the operating personnel of such machining centers.

The embodiment of the invention provides that the projecting element is disposed in the bore of the spindle and the groove in a circumferential surface of the shaft of the tool fitting. In this way, a dynamically especially advantageous, since rigid, fitting results. The contact faces of the interface are only insignificantly decreased or weakened through the locking.

The same advantage is offered by the measure that the projecting element is held movably in an opening of the spindle and a securement element acting onto the projecting element is provided.

Advantageously is provided that the securement element is implemented as a manacle ring with an oblique ramp face acting onto the projecting element. Due to the oblique ramp face a further augmentation of the clamping force occurs. In most cases therefore the manual actuation of the manacle ring without additional tools is sufficient for clamping.

To increase the clamping forces it is additionally provided with advantage that the securement element includes an engagement for a clamping key for the adjustment of the manacle ring with respect to the spindle.

In an alternative embodiment the clamping can also readily be carried out by means of a hexagonal wrench, if a worm gear acting between the manacle ring and the spindle is provided.

The measure that the manacle ring and the spindle are coaxially screw-connected with one another by means of a gear also contributes advantageously to the short structural shape of the fitting.

The rigidity of the fitting is advantageously increased if the bore for receiving the shaft of the tool fitting is formed in the shape of a cone and the circumferential surface of the shaft is adapted thereto.

The same applies to the measure that the tool fitting includes a staying face on which the forward directed surface of the spindle rests.

The tolerances are advantageously so narrow that the arrangement has a static redundancy of contact faces between spindle and tool fitting, wherein in particular the conical faces of tool fitting and spindle as well as also the forward directed surface are formed such that they come into contact with the staying face after the clamping. The interface thereby behaves as if it were of one piece.

The new interface is especially suitable for the clamping of tool holders [sic] for CNC lathes, for example for equipping tool turrets, including star turrets. However, it can also quite generally be utilized for the purpose of clamping techniques in jigmaking and, instead of tools, in special cases workpieces and the like can also be clamped.

Details of the invention are evident on the basis of the following description of a preferred embodiment example with reference to the drawing.

The sole FIG. 1 shows an axial section through the substantially rotationally symmetric fitting according to the invention.

In FIG. 1 the tool fitting 1 is fixedly clamped with the spindle 2. On a forward directed surface 3 of the spindle 2 a staying face 20 adapted thereto of the tool fitting 1 is in contact. In addition, the conical faces of the shaft 5 of the tool fitting 1 and of a bore 4 are fixedly in contact one on top of the other in the spindle.

This static redundancy of the contact faces is a consequence of the narrow fabrication tolerance as well as of the corresponding clamping forces.

The clamping forces are applied via a manacle ring 15. The manacle ring 15 can either be rotated manually relative to the spindle 2 or by means of a key which extends into the key engagement 17. For this purpose the spindle 2 comprises outer threads 19, onto which the manacle ring is screwed with its inner threads 19. An inner cone-like ramp face 16 worked into the manacle ring 15 presses onto the ball 21, which, in turn, via the groove 12 worked into the tool fitting 1 presses the shaft 5 of the tool fitting 1 into the conical face of the bore 4. In this way a torque can be transmitted from the spindle 2 via the conical face of the bore 4 and of the shaft 5 onto the tool fitting 1.

By rotating the manacle ring 15 into the opposite direction, the pressing can be cancelled out and the staying face 20, which during the clamping has reached the contact face 3, can be separated. As soon as this has taken place, the tool fitting is rotatable radially by a certain angle. The groove 12, which is indicated by an intermittent line, can move over the ball 21 until the ball 21 has reached at site at which the groove changes direction parallel to the axis. In this position the tool fitting 1 can be pulled axially from the spindle 2, since the groove 12 terminates free in the end face 10. Consequently the groove 12 extends from the end face 10 first in the axial direction and subsequently changes direction in the circumferential direction on the circumferential surface 11, into which it has been worked.

In order for the ball 21 not to fall out of opening 13 of spindle 2, a resilient retaining element 25 is provided obliquely in the spindle. This retaining element presses onto the ball at a suitable site such that the ball is secured against falling out.

A worm gear 18 is indicated in dash-dot line alternatively to the adjustment of the manacle ring 15 by means of the key engagement 17. This gear can be actuated for example by means of a hexagonal wrench such that it rotates with corresponding transmission ratio the manacle ring 15 on the threads 19.

In the device 6 for locking the ball 21 consequently acts as a projecting element 9 in the manner of a bayonet coupling for the axial locking of the inner locking element 7 with the outer locking element 8.

The spindle 2, in turn, is held rotationally movable in ball bearings 22 in housing 23. The ball beatings are axially secured on the spindle 2 through the shaft nut 24.

All of the parts are disposed rotationally symmetrical. Overall three devices disposed offset by 120 degrees in each case are advantageously provided for the locking.

Bores may be axially provided, for example in order to supply cooling lubricant.

In this way a universal interface is provided, which has axially an especially short structural form and has an advantageously high dynamic rigidity.

LIST OF REFERENCE NUMBERS

1 Tool fitting
2 Spindle
3 Surface (forward directed)
4 Bore
5 Shaft
6 Device for locking
7 Inner locking element
8 Outer locking element
9 Projecting element
10 End face
11 Circumferential surface
12 Groove
13 Opening
14 Securement element
15 Manacle ring
16 Ramp face
17 Engagement
18 Worm gear
19 Threads
20 Staying face
21 Ball
22 Ball bearing
23 Housing
24 Shaft nut
25 Retaining element

The invention claimed is:

1. Arrangement for holding a tool fitting (1), in particular for driven tools, the arrangement comprising: a spindle (2) with a forward directed surface (3) and a bore (4) which intersects the forward directed surface and which, starting from such surface, extends rearwardly in order to receive a shaft (5) of the tool fitting (1), as well as with a device (6) for locking the tool fitting with the spindle (2), in which an inner (7) and an outer (8) locking element are provided, which engage with one another, the locking elements (7, 8) being implemented such that they act in the manner of a bayonet coupling, wherein a projecting element (9) is disposed in a blind stop groove (12) extending first axially subsequently radially in a circumferential surface (11) starting from an end face (10), the projecting element (9) being held movably in an opening (13) of the spindle (2), a securement element (14) being is provided and acting onto the projecting element (9), the securement element (14) comprising a manacle ring (15) with an oblique ramp face (16) acting onto the projecting element (9), and a worm gear (18) acting between the manacle ring (15) and the spindle (2).

2. Arrangement as claimed in claim 1, wherein the projecting element (9) is disposed in the bore (4) of the spindle (2) and the groove (12) in the circumferential surface (11) of the shaft (5) of the tool fitting (1).

3. Arrangement as claimed in claim 1, wherein the securement element (14) includes an engagement (17) for a clamping key for the adjustment of the manacle ring (15) relative to the spindle (2).

4. Arrangement as claimed in claim 1, wherein the manacle ring (15) and the spindle (2) are coaxially screw-connected with one another by means of threads (19).

5. Arrangement as claimed in claim 1, wherein the bore (4) for the reception of the shaft (5) of the tool fitting (1) is formed conically and the circumferential surface of the shaft is adapted thereto.

6. Arrangement as claimed in claim 1, wherein the tool fitting (1) includes a staying face (20) for the contact on the forward directed surface (3) of the spindle (2).

7. Arrangement as claimed claim 1, wherein it has a static redundancy of contact faces between spindle (2) and tool fitting (1), wherein, after the clamping in particular the conical faces (11, 4) of tool fitting (1) and spindle (2) as well as also the forward directed surface is formed such that it is in contact with the staying face (20).

* * * * *